Dec. 18, 1956    J. CORDES ET AL    2,774,498
MATERIALS HANDLING FORK TRUCK
Filed Oct. 28, 1954    3 Sheets-Sheet 1
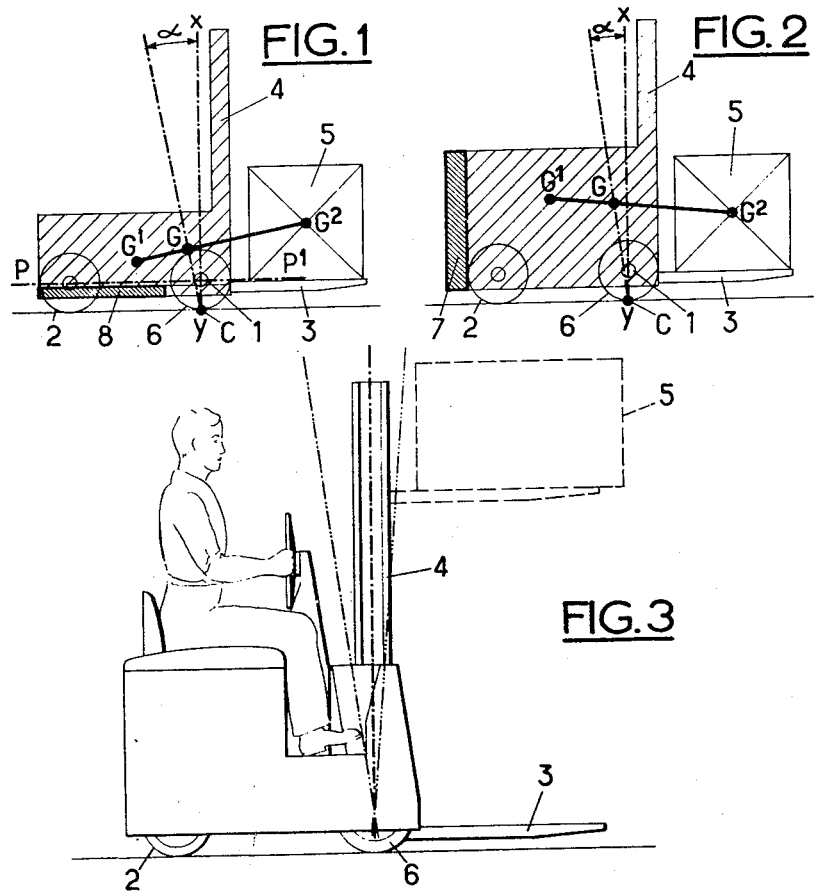
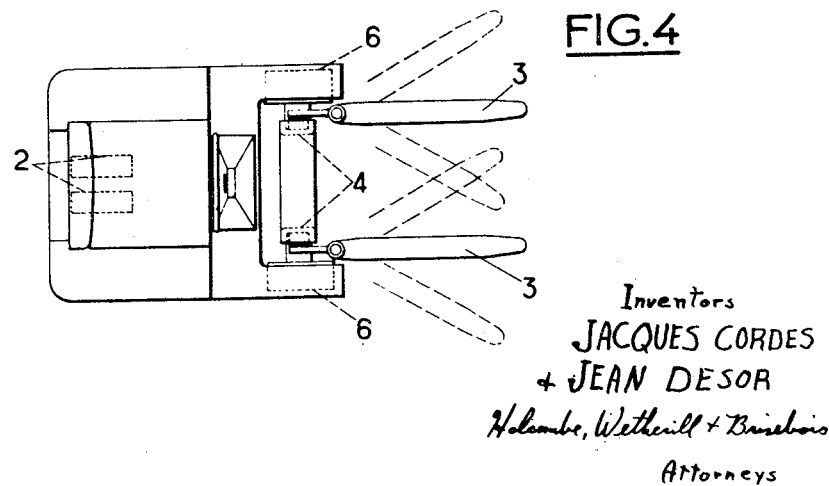
Inventors
JACQUES CORDES
+ JEAN DESOR
Holcombe, Wetherill + Brisebois
Attorneys

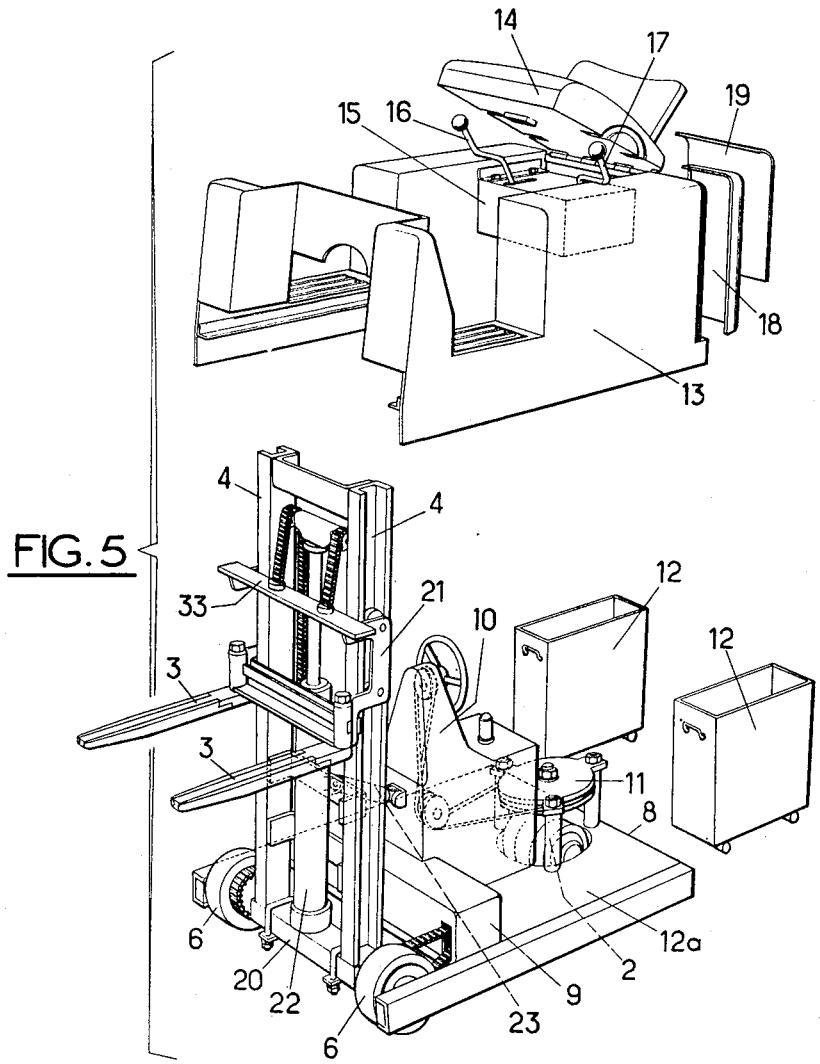

Dec. 18, 1956  J. CORDES ET AL  2,774,498
MATERIALS HANDLING FORK TRUCK
Filed Oct. 28, 1954  3 Sheets-Sheet 3
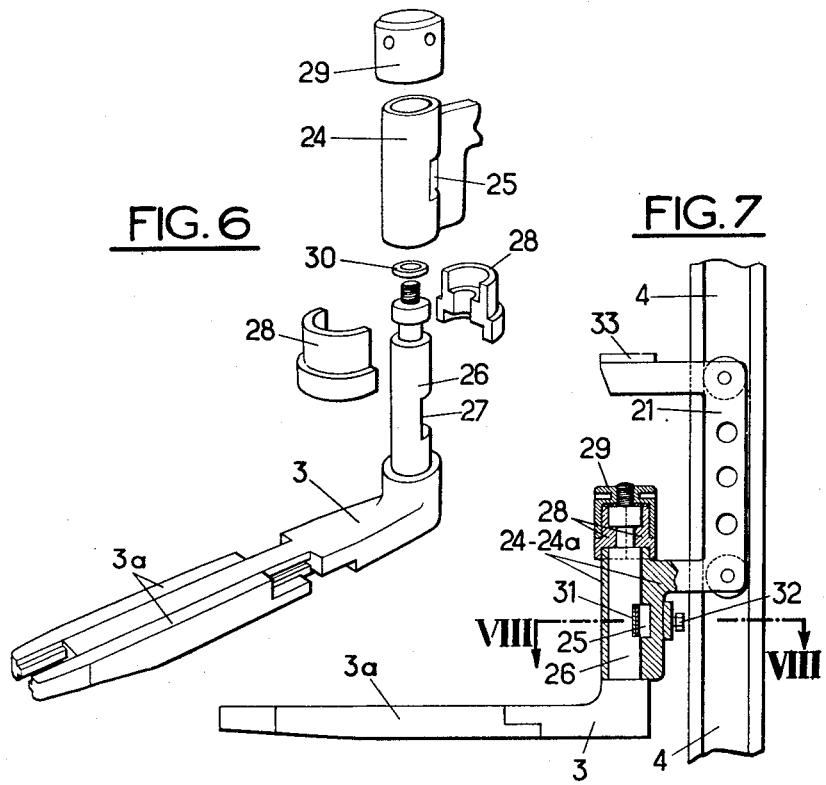
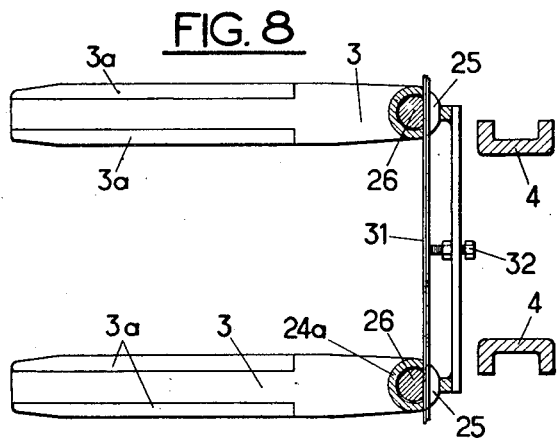
Inventors
JACQUES CORDES
+ JEAN DESOR
Holcombe, Wetherill + Brisebois
Attorneys

United States Patent Office 2,774,498
Patented Dec. 18, 1956

2,774,498

MATERIALS HANDLING FORK TRUCK

Jacques Cordes, Versailles, and Jean Desor, Paris, France

Application October 28, 1954, Serial No. 465,354

Claims priority, application France November 4, 1953

4 Claims. (Cl. 214—731)

The present invention has for its object a materials handling truck of the type using a fork for holding a load to be handled, said truck being used for conveying and handling overhanging loads. Such truck has reduced overall dimensions and a great easiness for manoeuvring on all surfaces including those having a steep gradient.

It is characterized by the hereinafter described features which are applicable alone and in various suitable combinations.

A primary object of the invention is a truck in which the usual frame comprising longitudinal and cross-members or the frameless box-girder have being entirely dispensed with and, according to the invention, replaced by an underslung horizontal platform of relatively substantial weight the upper face of which lies somewhat below the plane parallel to said face and passing by the geometrical axis of the front wheel axle, whereby combining the interconnecting function of the usual truck frame or similar member and the counterbalancing function of a usual separate vertical auxiliary counterbalancing plate mounted on the back of the truck, while bringing the aggregated gravity center of the truck loaded with its maximum admissible load down to its lowermost position.

Another object of the invention is to separately assemble all means useful for operating its driving wheels for performing its manoeuvring as well as the lift and handling operations in the form of detachable independent units attached on said underslung platform by easy accessible means, thus enabling their mounting and dismounting in a short lapse of time.

A further object of the invention is to provide the fork of the lifting mechanism with expandible prongs.

According to another object of the invention, the said prongs are so pivotally mounted that, when they hit an obstacle, they pivot and move aside either independently one from the other, when not in use, or simultaneously, when they are carrrying a load, thus preventing any risk of damaging the truck and/or the load then being conveyed; said prongs being automatically brought back in normal position, by means of a spring, as soon as the thrust caused by the obstacle ceases.

According to a further object of the invention, the lifting apron, or the forks mounted on the apron may be associated with pivoted clamps, claws or other grasping or holding means, controlled by hydraulic or other devices and enabling the operator to grasp, load and unload, one by one or several together, elongated loads, such as steel bars, beams, wooden logs, blanks etc.

It is a further object of the invention to provide the lifting apron with means adapted for receiving various toolings which are either hand or hydraulically driven, interchangeable and adapted for the type of work intended to be performed.

Other objects and advantages will be apparent and the invention itself will be best understood with reference to the following specification given solely by way of illustrative example and to the accompanying drawing, in which:

Figure 1 is a diagrammatic view showing the general arrangement of the underslung platform of the truck according to the invention;

Figure 2 is also a diagrammatic view showing a truck of the usual type having a counterweight at its rear portion.

Figure 3 is an elevational side view of a preferred embodiment of the truck according to the invention.

Figure 4 is a top plan view of the truck shown in Fig. 3.

Figure 5 is a perspective diagrammatic view, showing the assembling of the components of the truck, including its body assembly.

Figure 6 is a perspective view showing in detail the components of a fork according to the invention.

Figure 7 is a view showing, partly in section and partly in elevation, the manner of assembling the fork on the vertical guides of the truck gantry.

Figure 8 is a cross-section, by VIII—VIII, of Fig. 7.

Before describing the invention, it may be useful, for a full understanding of the same, to briefly mention the usual components of a fork truck, with reference to the Figs. 1 and 2, namely:

A frame or chassis, which may be of the self-propelling type or not, comprising a front-axle 1 and a set 2 of rear wheels;

A lifting apparatus comprising a support directly receiving the load to be handled, such support, which is in the form of a fork 3 or any other member adapted to the form and the nature of said load being compelled to follow forward or backward.

In order to facilitate the understanding of the advantages resulting from the utilisation of an under-slung platform in the truck according to the invention, the different elements will be designated as follows:

G1 is the gravity center of the truck when empty; G2 is one of the possible positions of the gravity center of the overhanging load 5 on the fork 3 in front of the truck, and G is the aggregated gravity center of the whole i. e. of the truck carrying its load 5.

On horizontal surfaces, the condition of balance are satisfied when the point G is on the left side (as viewed in Figs. 1 and 2) of the vertical plane X—Y passing through the line of contact C of the front wheels 6 with the floor or roadway.

On an inclined floor or roadway, the equilibrium or balance will be upset as soon as the angle made by the floor or roadway with the horizontal plane will be greater than the angle formed by the straight lines X—Y and Y—G, and corresponding to the relative position of the truck and the floor or roadway when the latter is horizontal.

In order to move the gravity center G away from the line X—Y, the manufacturers have made the truck heavier by placing a counterweight 7 (Fig. 2) as far as possible at the rear portion of the vehicle. In order to avoid making the vehicle too long, which would impair the manoeuvring possibilities of same, such manufacturers have made the counterweight in the form of a vertical shield or plate. Accordingly, the center of gravity G has certainly been moved further away from the line X—Y, but the center of gravity G1 has been simultaneously moved away from the floor or roadway, and, for a given position of G2, the aggregated center of gravity G has been brought to a higher level above the supporting surface, a solution which obviously reduces the α angle, which practically defines the extent of the range of stability of the loaded vehicle, such vehicle being ready and close to capsize when such α angle is null due to an excessive weight of the load 5, to the excessive gradient of the supporting surface or for the cumulative action of both causes.

The counterweight 7 placed at the rear of the vehicle gives entirely satisfaction only when the truck is running on horizontal surfaces. However, the addition of such counterweight brings the center of gravity of the loaded truck further up away from the supporting axes of the vehicle on the ground; accordingly, the maximum limit of the slope angle of the inclined surfaces upon which the truck can safely run forward when carrying its load is correspondingly reduced.

In contradistinction with the previous arrangement above described, the improved truck which is the object of the present invention comprises no counterweight at the rear. Besides, instead of comprising a frame of chassis or a frameless body of box-girder construction, similarly to the trucks in current use, the components of said improved truck are mounted on a substantially heavy and underslung horizontal platform, such as the very thick horizontal platform 8 illustrated in Fig. 1 the upper surface of which is situated in a plane somewhat below the plane P—P₁ passing through the axis of the front axle 1 (Fig. 1). Owing to this arrangement, the gravity center G is brought closer to the vertical line X—Y, but, by giving the platform a sufficient weight, the balance conditions of the loaded truck on horizontal surfaces remain satisfied. However, in the truck of Fig. 1, the point G is considerably lowered and the α angle is greater than in the case of the truck of Fig. 2 and, therefore, the truck of Fig. 1 embodying the platform feature of the invention may safely run on surfaces inclined at substantially greater angles to the horizontal.

Besides, the arrangement of Fig. 1 enables to reduce the weight and the length of the truck, specially in the case when the truck is intended to run on rough or hilly ground, to increase its manoeuvring possibilities and to cut down its fabrication cost.

Another important feature of the invention comprises the arrangement of the truck components on the underslung platform 8. Such arrangement is fully illustrated in Fig. 5. Such components are grouped by nature in order to form detachable independent units or blocks, which are secured in place, for instance, by means of plain bolts in order to greatly facilitate their mounting and eventual dismounting.

The elements grouped in said detachable units are known per se and, therefore, will not be described hereinafter, since they are not a part of the present invention.

The unit 9 is the driving unit operating the front wheels 6. The unit 9 comprises: two motors, one for each wheel; two reduction gears; one brake for each motor; one brake-releasing lever; a quick plug connexion between the control box hereinafter mentioned and the motors; an instantaneous connection between the brake-releasing foot lever and the motor brakes.

The unit 10 comprises a box supporting the steering wheel, the main and auxiliary contactors, the speed lever, the reversing lever and all the necessary electrical equipment.

The unit 11 or steering unit comprises the two directing rear wheels 2 and the operating means therefor.

The units 12 comprise battery-supporting boxes mounted on rolls to fit on the platform 8 at 12a, on both sides of unit 10 and 11.

The unit 13 comprises a body assembly fitting on the platform 8 and into which body assembly the above described units closely fit. Below a detachable seat 14, such body carries a unit 15 or hydraulic unit which is placed atop the unit 11. Such hydraulic unit 15 comprises: a pump; two distributing devices; an electric motor; a transmission; pipes and outlets to the lifting and tilting jacks hereinafter described; and the lift control lever 16 and front gantry tilt control lever 17. Detachable plates 18 and 19 allow free access into the truck through the rear portion thereof.

The front or driving unit 20 comprises an axle member and both driving wheels 6.

The gantry comprises two uprights or guiding rails 4 upon which are adapted to move rolls carried by the load lifting apron 21. In a manner known per se, such gantry is associated with a lifting jack 22 and a tilting jack 23.

An essential feature of the invention resides in the construction of the prongs 3 of the lifting fork secured on the lifting apron 21. One of said fork prongs is illustrated in details in Fig. 6, 7 and 8.

At its lower position, the apron 21 comprises two sleeve members 24, 24a provided with transverse slots. In such sleeves are force driven the journals or pivots 26 of two prongs 3 of suitable shape which comprise the fork. Such pivots 26 are provided with slots 27 mating with the aforesaid slots 25. Such pivots are held in place by means of a pair of semicylindrical bushings 28 and a locking cap 29 with a friction washer 30 therebetween. A laminated spring 31, extending through the slots 25 and 27, connects the two prongs 3. Such spring is loaded forwardly by means of a tensioning or loading member 32 and under normal conditions, holds the prongs 3 in parallel relationship. In case of an undue thrust exerted on the prongs sidewise, the latter are capable of pivoting on their pivot 26 and such prongs are brought back into normal position by the spring 31, as soon as such thrust has disappeared, the force of such return action being directly in proportion with the load of spring 31.

Preferably, the above described prongs 3 comprise each an expandible portion 3a to adjust them lengthwise at will according to the nature of the load to be handled.

Furthermore, the apron 21 may comprise, for instance, at its upper portion, a cross member 33 provided with holes or any securing means enabling to mount suitable tools corresponding to the particular handling problem involved. As already mentioned above, any device adapted for grasping, loading and unloading one by one or several together, elongated loads, such as beams, metal bars, etc., may be combined with the lift system according to the invention.

We claim as our invention:

1. Material handling fork truck comprising an underslung horizontal platform of relatively substantial weight embodied in the essential structure of said truck, the upper face of which platform lies in place somewhat below the longitudinal axis of the front wheel axle, means mounted on said platform for controlling the lifting and handling operations, load holding means comprising a fork having pivoted prongs; an apron member for supporting said pivoted prongs, this apron member comprising two sleeve members provided with transverse slots; two prongs the journals of which are force driven in said sleeves, these journals being provided with slots mating with the aforesaid slots; a pair of semi-cylindrical bushings and a locking cap with a friction washer therebetween for holding in place said journals; a laminated spring extending through the slots of the sleeve members and the slots of the journals, this laminated spring connecting the two prongs; means for tensioning or loading the spring which, under normal conditions, holds the prongs in parallel relationship.

2. A lift truck comprising a heavy flat horizontally disposed counterweight serving as a platform, front and rear axles supporting opposite ends of said platform, wheels on said axles, a vertical trackway at the front end of said truck, parallel fork prongs slidably mounted in said trackway, and means on said truck for raising said fork prongs along said trackway, the upper surface of said counterweight lying in a horizontal plane lower than the longitudinal axis of said front axle, each fork being fixed to a C-shaped sleeve partially encircling a vertical pin, said C-shaped sleeves being open toward the rear of the truck, and leaf spring means parallel to the front end of said platform bearing against the open ends of said C-shaped sleeves so as to normally maintain the line between said open ends parallel to the front end of said platform and the fork arms carried by said C-shaped sleeves perpendicular thereto, whereby turning of said fork prongs beyond the point at which said leaf spring means contacts the ends of the C-shaped sleeves so that it contacts instead the arc of said sleeves eliminates further resistance to the pivotal movement of said prongs and permits them to be turned back over said platform.

3. A lift truck comprising a heavy flat horizontally disposed counterweight serving as a platform, front and rear axles supporting opposite ends of said platform, wheels on said axles, a vertical trackway at the front end of said truck, parallel fork prongs slidably mounted in said trackway, and means on said truck for raising said fork prongs along said trackway, the upper surface of said counterweight lying in a horizontal plane lower than the longitudinal axis of said front axle, each fork prong being pivotally mounted to turn about a vertical axle and carrying a sleeve of generally circular cross-section, a portion of said sleeve being cut away at the side opposite said prong, and the axle beneath it flattened to form a groove adapted to receive a leaf spring which presses against the cut edges of said sleeve, urging it into a position in which said prong projects straight forward from the platform, but permits the sleeve to be turned against the resistance of the spring into such a position that the spring no longer engages its cut edges but contacts instead its remaining curved surface, thus eliminating further resistance to its rotation and consequently permitting said prongs to be turned through a half circle so as to project backwardly over the platform.

4. A lift truck comprising a front axle, wheels on said front axle, a vertical trackway supported by said front axle, parallel fork prongs slidably mounted in said trackway and normally extending forwardly therefrom to support a load, means on said truck for raising said prongs along said trackway, two parallel side members, one mounted on each end of said front axle, a heavy, thick, horizontal flat counterweight serving to counterbalance said load and as a connecting platform carried by and between said side members with its upper surface below the longitudinal axis of said front axle, said counterweight being provided with an aperture in its rear end, rear wheel supporting means carried on said counterweight, and at least one rear wheel rotatably mounted on said rear wheel supporting means and turning in said aperture about a horizontal axis above the upper surface of said counterweight, said counterweight extending forwardly to a point nearer said front wheels than said rear wheel, and serving to bring the center of gravity of the truck down to a relatively low point.

References Cited in the file of this patent

UNITED STATES PATENTS

| | | |
|---|---|---|
| 2,234,851 | Asper | Mar. 11, 1941 |
| 2,271,624 | Cochran | Feb. 3, 1942 |
| 2,504,885 | Schreck | Apr. 18, 1950 |
| 2,536,068 | Lehmann | Jan. 2, 1951 |
| 2,561,300 | Walker | July 17, 1951 |
| 2,605,918 | Roscoe | Aug. 5, 1952 |
| 2,613,828 | Eliott et al. | Oct. 14, 1952 |
| 2,693,250 | Barrett | Nov. 2, 1954 |
| 2,706,062 | Turner et al. | Apr. 12, 1955 |